Patented Nov. 21, 1944

2,363,187

UNITED STATES PATENT OFFICE 2,363,187

TREATMENT OF HYDROCARBONS

Edwin T. Layng, Jersey City, N. J., assignor to Process Management Company, Inc., New York, N. Y., a corporation of Delaware No Drawing. Application November 25, 1938, Serial No. 242,294

10 Claims. (Cl. 260—683.3)

This invention relates to changing the carbon-hydrogen ratio of hydrocarbons by hydrogenation and dehydrogenation reactions and the preparation of an active catalyst for these reactions. More particularly, the invention relates to a novel method for the preparation of an active chromic oxide catalyst.

The preparation of the chromium oxide catalyst in active form is effected by heating an oxygen compound of chromium capable of thermally decomposing to a residue comprising chromic oxide, with a flux comprising an oxygen compound of boron until fusion and subsequent decomposition reactions are completed and then suitably washing the residue. Oxygen compounds of chromium which may be used include chromates and poly-chromates of ammonium, sodium, and potassium, chromium trioxide, chrome alum, chromium nitrate, chromium sulfate, chromium hydroxide, etc. Oxygen compounds of boron which may be used as the flux include boric acid, boric oxide, and borates such as borax.

Preferably the compounds of chromium and boron are first intimately mixed, for example, in the form of a paste with water, after which the mixture is heated in a container with sufficient freeboard to accommodate the swelling which occurs during the reaction. Fusion of the mixture occurs at a relatively low temperature. As the temperature rises reaction begins and volatile by-products are driven off. The temperature may be allowed to go to a relatively high temperature, for example, as high as 700° to 800° C. After the reaction ceases, as indicated by the absence of evolution of by-products, the reaction mass is drawn. The fused residue may be thrown into water while hot and the mixture allowed to boil for some time, or the mass may be cooled and then decomposed with steam after which the residue is washed with water. After thorough washing the material is ready for use as a catalyst. The final washing may be supplemented by a prolonged boiling with water or dilute sulfuric acid, followed by final washing and drying, in order to improve the stability of the material as a catalyst.

The invention will be further understood by reference to the following example of the preparation of the catalyst.

Example I

One part by weight of finely powdered ammonium dichromate is mixed with three parts of powdered boric acid and enough water to make a firm paste. The mixture is charged to a muffle furnace and heated at a temperature of approximately 650° C. until the reaction has ceased. About one hour is usually adequate for the completion of the reaction. During the heating the hexavalent chromium is transformed to the trivalent variety with accompanying evolution of oxygen, nitrogen, ammonia, steam and boric acid. The resultant porous brittle mass is transferred while hot to a large volume of distilled water, in which it readily disintegrates, and boiled for about an hour after which it is filtered and the residue is washed several times with distilled water. After washing the material contains a small remainder of boron, usually one or two per cent calculated as $B_2O_3$. Ordinarily a larger amount is not desirable. The remaining material is dried, for example, in an oven of 100° to 110° C. The dried material can be ground readily in a mortar to an impalpable powder, ordinarily bright green, which is pelleted before use as a catalyst.

The chromium oxide catalyst prepared by this method is highly active as a catalyst for hydrogenation and dehydrogenation reactions. For example, in the dehydrogenation of heptane at 475° C. the catalyst prepared according to Example I exhibits an activity twice that of a gel-type chromium oxide catalyst prepared by drying the gelatinous precipitate produced in a dilute chromium salt solution.

In the treatment of the hydrocarbon to change the carbon-hydrogen ratios in the presence of the novel catalyst the hydrocarbons are passed over the catalyst, preferably in the gaseous or vaporous state, at an elevated temperature. The temperature selected will depend somewhat upon the nature of the hydrocarbon undergoing treatment and the nature of the reaction involved, but it will be found that the temperatures ordinarily employed in dehydrogenation fall within the range of 350° C. to 650° C. The time during which the hydrocarbons should be subjected to the action of the catalyst at the reaction temperature will depend upon the degree of hydrogenation or dehydrogenation desired. For example, in dehydrogenation reactions a time of contact of a few seconds may be sufficient if simple dehydrogenation only is desired. However, if cyclization and production of aromatics is desired a longer reaction time may be necessary.

The improved catalyst of the present invention may be used in the treatment of pure hydrocarbons or may be used in the treatment of mixtures of hydrocarbons. For example, the catalyst may be employed in the treatment of naphtha to improve the anti-knock value thereof as gasoline motor fuel by passing the naphtha over the catalyst at elevated temperature. For example, an East Texas heavy naphtha having a C. F. R. M. octane number of 37.7 after passage over the improved catalyst at 475° C. exhibits an octane number of 53.5.

Not only is the improved catalyst more active initially than the gel-type catalyst mentioned above, as shown by the relative volumes of gas evolved in the first five-hour periods under similar conditions of operation, but the improved catalyst shows a rate of decline in activity much lower than that displayed by the gel-type chromium oxide catalyst. For example, in the use of the gel-type catalyst it is found that the activity of the catalyst decreases during the five-hour period by approximately 90% whereas the new catalyst exhibits an activity in the third five-hour period greater than the activity of the gel-type catalyst in its first five-hour period; activity in this case being compared on the basis of the relative volumes of gas (hydrogen) evolved.

I claim:

1. A method of changing the carbon-hydrogen ratio of a hydrocarbon which comprises bringing said hydrocarbon at elevated temperature into contact with a catalyst having as an active ingredient thereof chromic oxide formed by heating an oxygen compound of chromium, capable of thermally decomposing to a residue comprising chromic oxide, with a flux comprising an oxygen compound of boron to fuse the mixture of compounds of chromium and boron, heating the resulting fused mass to decompose said compound of chromium to chromic oxide, and washing the residue to remove boron compounds therefrom.

2. A method in accordance with claim 1 wherein the oxygen compound of chromium is selected from the group consisting of chromates and poly-chromates of ammonium, sodium and potassium, chromium trioxide, chrome alum, chromium nitrate, chromium sulfate and chromium hydroxide.

3. A method in accordance with claim 1 wherein the oxygen compound of boron is selected from the group consisting of boric acid, boric oxide and borax.

4. The method of changing the carbon-hydrogen ratio of hydrocarbons which comprises bringing said hydrocarbons at elevated temperature into contact with a catalyst comprising as an active ingredient chromic oxide prepared by heating ammonium dichromate with a flux comprising boric acid to fuse the mixture of ammonium dichromate and boric acid, heating the resulting fused mass to effect decomposition of said dichromate to chromic oxide, and washing the residue to remove boron compounds therefrom.

5. The method of dehydrogenating a hydrocarbon which comprises contacting said hydrocarbon at elevated temperature with a catalyst having as an active ingredient chromic oxide formed by heating an oxygen compound of chromium, capable of thermally decomposing to a residue comprising chromic oxide, with a flux comprising an oxygen compound of boron to fuse the mixture of compounds of chromium and boron, heating the resulting fused mass to decompose said compound of chromium to chromic oxide, and washing the residue to remove boron compounds therefrom.

6. The method of claim 5 wherein said hydrocarbon is an aliphatic hydrocarbon containing at least six carbon atoms per molecule and is maintained in contact with said catalyst at elevated temperature for a time sufficient to effect cyclization of said aliphatic hydrocarbon and conversion thereof to an aromatic product.

7. The method of claim 5 wherein said hydrocarbon is an aliphatic hydrocarbon having at least six carbon atoms per molecule and is maintained in contact with said catalyst at elevated temperature for a time longer than that necessary to effect simple dehydrogenation.

8. The method of changing the carbon-hydrogen ratio of a hydrocarbon which comprises bringing said hydrocarbon at elevated temperature into contact with a catalyst having as an active ingredient thereof chromic oxide formed by heating an oxygen compound of chromium, capable of thermally decomposing to a residue comprising chromic oxide, with a flux comprising an oxygen compound of boron to fuse the mixture of compounds of chromium and boron, heating the resulting fused mass to decompose said compound of chromium to chromic oxide, and washing the residue to remove boron compounds therefrom to reduce the boron content to a proportion not substantially greater than 2 per cent of $B_2O_3$.

9. The method of treating naphtha to improve the anti-knock value thereof as gasoline motor fuel which comprises contacting said naphtha at elevated temperature with a catalyst having as an active ingredient chromic oxide formed by heating an oxygen compound of chromium, capable of thermally decomposing to a residue comprising chromic oxide, with a flux comprising an oxygen compound of boron to fuse the mixture of compounds of chromium and boron, heating the resulting fused mass to decompose said compound of chromium to chromic oxide, and washing the residue to remove boron compounds therefrom.

10. The method of changing the carbon-hydrogen ratio of a hydrogen which comprises bringing said hydrocarbon at elevated temperature into contact with a catalyst having as an active ingredient thereof chromic oxide formed by heating an oxygen compound of chromium, capable of thermally decomposing to a residue comprising chromic oxide, with a flux comprising an oxygen compound of boron to fuse the mixture of compounds of chromium and boron, heating the resulting fused mass to effect decomposition of said chromium compound to chromic oxide, decomposing the fused residue with water to a powdered product, and subjecting the powdered material to prolonged boiling with diluted sulfuric acid prior to final washing and drying in order to improve the stability of the material as a catalyst.

EDWIN T. LAYNG.